United States Patent [19]
Fausten

[11] Patent Number: 5,738,126
[45] Date of Patent: Apr. 14, 1998

[54] APPARATUS FOR CONTROLLING A DIESEL ENGINE WITH EXHAUST

[75] Inventor: Hans Fausten, Winterbach, Germany

[73] Assignee: Mercedes-Benz AG, Stuttgart, Germany

[21] Appl. No.: 835,376

[22] Filed: Apr. 7, 1997

[30] Foreign Application Priority Data

Apr. 19, 1996 [DE] Germany ............... 196 15 545.2

[51] Int. Cl.$^6$ .................. F02M 25/07; F02D 9/08
[52] U.S. Cl. .................. 123/569; 123/571; 123/399
[58] Field of Search .................... 123/568, 569, 123/571, 361, 378, 399; 60/605.2

[56] References Cited

U.S. PATENT DOCUMENTS

| | | | |
|---|---|---|---|
| 4,467,775 | 8/1984 | Buck et al. | 123/569 |
| 4,491,112 | 1/1985 | Kanegae et al. | 123/399 |
| 4,671,235 | 6/1987 | Hosaka | 123/399 |
| 4,727,848 | 3/1988 | Stumpp et al. | 123/569 |
| 5,150,694 | 9/1992 | Currie et al. | 123/569 |
| 5,601,068 | 2/1997 | Nozaki | 123/569 |

FOREIGN PATENT DOCUMENTS 42 14 880  11/1992  Germany .

OTHER PUBLICATIONS

"Motronic Engine Management", Robert Bosch GmbH, pp. 50 to 53, Aug. 1994.

E. Pauli et al., "Regel Strategie Des Comprex®–Aufgeladenen Dieselmotors Zur Emissions Minimierung", MTZ Motottechnische Zeitschrift 50, pp. 263–268, Jan. 1989.

Primary Examiner—Willis R. Wolfe
Attorney, Agent, or Firm—Klaus J. Bach

[57] ABSTRACT

In an apparatus for controlling a Diesel engine with exhaust gas recirculation and intake air throttling a control circuit is provided by which the intake air flow pressure is controlled by means determining the desired intake air pressure for intake air throttling operation. During operations utilizing charge air the charge air pressure is controlled by means determining a desired intake air pressure representing the sum of a desired engine operating point-dependent base pressure value and a desired supplemental pressure value which comprises the product of a desired supplemental raw pressure value which is dependent on engine speed and a fresh intake air mass flow control difference and a factor which depends on the opening degree of the exhaust gas recirculation control number.

3 Claims, 1 Drawing Sheet

APPARATUS FOR CONTROLLING A DIESEL ENGINE WITH EXHAUST

BACKGROUND OF THE INVENTION

The invention relates to an apparatus for controlling the operation of a Diesel engine with exhaust gas recirculation and intake air throttling, including a control circuit for controlling the rate of exhaust gas recirculation by means of an exhaust gas recirculation controller utilizing the intake air mass flow as a control value and a control circuit for controlling the air pressure in the intake air duct by throttling the air flow in the intake air duct.

Such apparatus are known with various variations wherein the exhaust gas recirculation and the throttling of the intake air are commonly utilized for the purification of Diesel engine exhaust gases. In turbocharged Diesel engines, as well as in normally aspirated Diesel engines with electronic engine control devices, exhaust gas recirculation and intake air throttling are controlled by two independent control circuits.

The exhaust gas recirculation is achieved by an engine operation-dependent control of an exhaust gas recirculation control member whose position is adjusted, depending on engine speed, engine load or the amount of fuel injected, coolant temperature, charge air temperature and atmospheric pressure, to a corresponding desired value. The exhaust gas recirculation rate, that is, the ratio of recirculated exhaust gas to the sum of the amounts of recirculated exhaust gas and fresh intake air is controlled by the engine control unit either indirectly by controlling the opening stroke of the control member wherein the opening position of the exhaust gas recirculation control member serves as a control and setting value, or directly, wherein, for example, the fresh air mass flow is measured by an air mass flow meter. This value is then utilized as the control value, and the position of the exhaust gas recirculation control member is the setting value. For simplification, it is assumed that, under constant engine operating conditions, the cylinder filling degree, that is, the sum of the amounts of fresh intake air and recirculated exhaust gas remains the same.

The publication "MOTRONIC ENGINE MANAGEMENT", Robert Bosch Gmbh, 1994, pages 50 to 53, discloses an apparatus for controlling the operation of an internal combustion engine with such an exhaust gas recirculation system including means for throttling the intake air flow. The apparatus is provided with a control circuit for controlling the exhaust gas recirculation flow by way of an exhaust gas recirculation control member using the fresh intake air mass flow as input value. The intake air flow can be throttled in order to increase the exhaust gas recirculation rate in cases where the desired exhaust gas recirculation rate cannot be achieved even if the exhaust gas recirculation control member is fully opened. A throttling of the intake air flow results in an increase of the pressure difference between the exhaust gas manifold and the intake air duct or, respectively, the charge air distribution duct whereby, for any particular opening position of the exhaust gas recirculation control member, the maximum exhaust gas recirculation rate can be increased.

With a charged Diesel engine, the charge air pressure is additionally controlled. In this respect, it is known to provide a common control structure for the intake air throttling and the charge air pressure, for example, by way of a so-called waste gate valve wherein, depending on the selected desired intake air pressure, which is greater or smaller than the atmospheric or reference pressure, the control switches between intake air throttling and charge air pressure control. With such a procedure, all three control circuits can be optimized independently of each other. It is necessary, however, to define characteristic desired value performance graphs for all three control functions. Also, the representation of the exhaust gas recirculation rate responsible for the emission behavior of the engine requires two independent desired value representations comprising an exhaust gas recirculation-and an intake air throttling base value characteristic graph.

In a commonly used alternative procedure, the exhaust gas recirculation and the intake air throttling are controlled by a common control circuit and the charge air pressure is independently controlled therefrom. With the common control for the exhaust gas recirculation and the intake air throttling the exhaust gas recirculation control member is first opened by a common controller, for example an electropneumatic pressure converter, and the intake air throttle valve is closed when exhaust gas recirculation control member is completely open and the exhaust gas recirculation rate should further be increased. This procedure can be performed on the basis of suitable characteristic curves for the two control members. Although with such a procedure, only one control is required for the two control functions, both involved controllers must be included in a control circuit inspite of their different transmission behavior. The control value is affected by component tolerances and the charge air pressure control on one hand and the throttle valve control on the other, operate independently from each other which may result in unstable operating characteristics. Furthermore, during intake air throttling, the intake air suction pressure is not controlled, but only set to a desired value.

Similar apparatus are described furthermore in the DOS 42 14 880 A1 and in a publication by E. Pauli and A. Amstutz in an article entitled "REGELSTRATEGIE DES COMPREX®-AUFGELADENEN DIESELMOTORS ZUR EMISSIONS MINIMIERUNG" (CONTROL STRATEGY OF THE COMPREX®-CHARGED DIESEL ENGINE FOR MINIMIZING EMISSIONS), MTZ Motortechnische Zeitschrift 50, 1989, page 263.

It is the object of the present invention to provide an apparatus which provides for an advantageous cooperation of exhaust gas recirculation and intake air flow throttling such that both can be applied in a flexible manner.

SUMMARY OF THE INVENTION

In an apparatus for controlling a Diesel engine with exhaust gas recirculation and intake air throttling a control circuit is provided by which the intake air flow pressure is controlled by means determining the desired intake air pressure for intake air throttling operation. During operations utilizing charge air the charge air pressure is controlled by means determining a desired intake air pressure representing the sum of a desired engine operating point-dependent base pressure value and a desired supplemental pressure value which comprises the product of a desired supplemental raw pressure value which is dependent on engine speed and a fresh intake air mass flow control difference and a factor which depends on the opening degree of the exhaust gas recirculation control number.

Such an apparatus controls the exhaust gas recirculation rate in a conventional manner utilizing the fresh intake air mass flow as a control value and, furthermore, provides for the intake air throttling a desired intake air pressure value which comprises the sum of a motor operating conditiondependent desired pressure base value and a desired supplemental pressure value. The desired supplemental pressure value defines, in an advantageous manner, the influence of the exhaust gas recirculation control as it is formed by the multiplication of an additional raw value which depends on the engine speed and the fresh intake air mass flow control difference of the exhaust gas recirculation rate control by a factor which depends on the position of the exhaust gas recirculation control member. This substantially simplifies the application since, in this manner, the throttling of the intake air flow and, if appropriate, the control of the charge air pressure adapt automatically to changes in the dimensions in the exhaust gas recirculation control circuit. It is therefore for example not necessary to change the desired intake air pressure graphs of the intake air pressure control arrangement or respectively the the charge air pressure control arrangement, when a new exhaust gas recirculation valve is installed.

With the presence of a charge air pressure control, this arrangement provides for a common control structure for the intake air throttling and the charge air pressure control by establishing a common characteristic base value graph, in which engine operating points-dependent desired charge air pressures are provided. Consequently, the apparatus provides for a true control during the intake air throttling operation and during charge air operation, not only for the setting of the intake air pressure. All three control circuits, that is, for the exhaust gas recirculation, for the intake air throttling and for the charge air pressure control can be realized in an optimal manner.

The exhaust gas recirculation rate which is important for the emission behavior of the engine is established in a single base characteristic graph for the desired value of the fresh intake air mass flow.

In an embodiment, the multiplication factor which depends on the opening cross-section of the exhaust recirculation control member is set to zero for an opening cross-section range between zero and a certain threshold value. In the range between the threshold value and the maximum opening cross-section, the multiplication factor than increases continuously to one. As a result, the multiplication factor representing the setting of the exhaust gas recirculation control member remains zero for small control member openings. Only from a predetermined threshold value it increases with increasing opening degree of the control member up to the value one. Consequently, with increasing opening degree, the desired pressure value base for the intake air duct pressure control is increasingly influenced by the desired pressure supplemental value which is given in the characteristic graph dependent on the engine speed and the fresh intake air mass flow control difference.

In another embodiment, an intake air minimum pressure characteristic graph is provided for a predetermined engine operating point dependent admissible desired intake air minimum pressure and a maximum selection unit is provided to which the desired minimum pressure and the pressure value obtained by the addition of the desired intake air pipe pressure value and the desired supplemental pressure value are applied and which selects therefrom the larger of the two values as the desired intake air pressure value for the intake air throttling and, if applicable, for the charge air pressure control. In this embodiment, a minimum pressure characteristic graph for the desired intake air pressure and a maximum selection unit are provided, which, on one hand, selects the largest value of the desired pressure values resulting from this performance graph and, on the other hand, of the desired base pressure value corrected by the supplemental desired pressure value as the determining desired intake air pressure. In this way, a control requirement for excessively low desired intake air pressures is avoided.

A preferred embodiment of the invention will be described below on the basis of the accompanying drawings:

DESCRIPTION OF A PREFERRED EMBODIMENT

Figure 2:
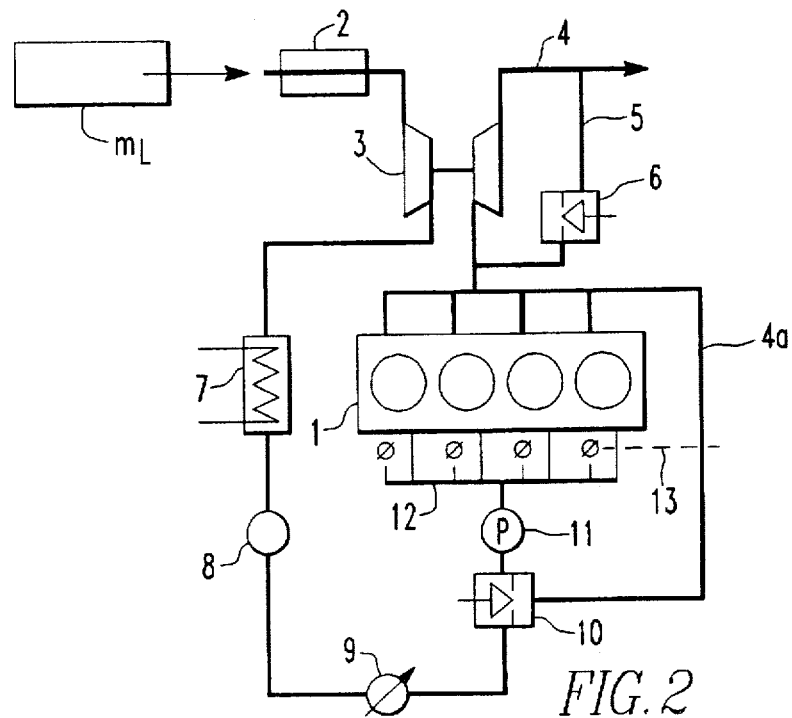
FIG. 2 shows schematically a Diesel engine controlled by an apparatus as shown in the block diagram of FIG. 1.

FIG. 2 shows a typical Diesel engine arrangement with a turbocharged Diesel engine 1 provided with exhaust gas recirculation, intake air throttling and charge air pressure control. The intake air mass flow $m_L$ is measured by an air mass flow meter 2 and directed to the charger of a turbocharger 3 whose turbine is disposed in the exhaust gas line 4. The exhaust gas line 4 is provided with a by-pass line 5 bypassing the turbine of the turbocharger 3 and including a so-called waste gate 6, that is, a valve by which the amount of exhaust gas flowing through the turbine, and accordingly the intake air pressure generated by the exhaust gas turbocharger 3, can be controlled.

After passing through the exhaust gas turbocharger 3, the fresh intake air mass flow $m_L$ is conducted through a charge air intercooler 7 and its temperature is then determined by an associated temperature sensor 8. The fresh intake air mass-flow $m_L$ then reaches a throttle valve 9 which serves as control member for throttling the intake air flow. From the throttle valve 9, the fresh intake air flows to an exhaust gas recirculation valve 10 which serves as a controller for the exhaust gas recirculation and which is in communication, by a branch line 4a, with the exhaust gas duct 4. In this exhaust gas recirculation valve 10, exhaust gas is admixed to the fresh intake air and the mixture, with a controllable amount of exhaust gas, enters the engine intake manifold 12 by way of a connecting line where the intake suction pressure p is measured by a pressure sensor 11. The air intake manifold 12 leading to the engine 1 includes the usual channel cut-off arrangement 13.

Figure 1:
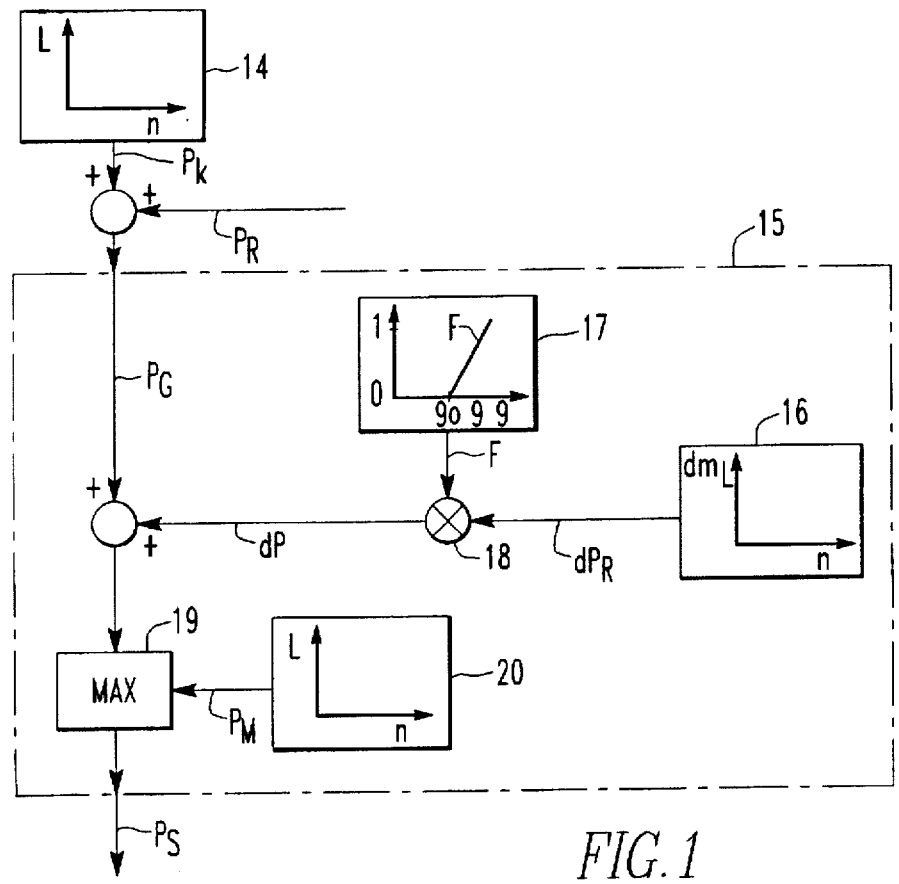
FIG. 1 shows, in a block diagram, the parts of an apparatus for controlling Diesel engines with exhaust gas recirculation and intake air throttling which are important with regard to the invention.

The Diesel engine arrangement of FIG. 2 includes various conventional engine control components which are not shown, particularly a suitable engine control unit with associated peripheral control elements in order to provide for exhaust gas recirculation, intake air flow throttling and charge air pressure control. FIG. 1 does not show all those conventional components for the control of a Diesel engine; it merely shows the novel components and measures which are employed by the present invention and which will be explained below in greater detail. The engine control arrangement provides for an exhaust gas recirculation control in the conventional manner wherein the position of the exhaust gas recirculation valve 10 serves as a regulated value and the fresh air mass flow $m_L$ measured by the air mass flow sensor 2 serves as the control value. The exhaust gas recirculation rate which is to be adjusted and which is important for the exhaust emission behavior of the engine is determined by way of a fresh inlet air mass-flow characteristic graph in which the desired value $m_{Ls}$ of the fresh air mass flow is given depending on various engine operating states including engine speed (rpm) n, the engine load or amount of injected fuel, the coolant temperature, the intake air temperature as sensed by the temperature sensor 8 and the atmospheric pressure.

For the throttling of the intake air flow and the control of the charge air pressure a common control structure is provided, in which the exhaust gas recirculation control with the components which have been described with reference to FIG. 1 are utilized. For this control structure, the engine control unit includes a stored base value characteristic performance graph 14 which covers suction air flow throttling and charge air pressure control and by which a common desired intake air raw pressure value $P_K$ is provided for both control functions depending on engine rpm (n) and engine load (L) indicating the degree by which the desired pressure, which serves as the reference pressure $P_R$ exceeds the atmospheric pressure. A subsequent addition of the raw pressure value $P_K$ taken from the base pressure characteristic graph 14 and the reference pressure $P_R$ provides a desired intake air duct base value $P_G$ which is supplied to a part 15 of FIG. 1 which is enclosed by the dotted line shown in FIG. 1 and in which the desired air pressure $P_s$ for the throttled intake air or for the charge air is determined.

The part 15 of the control circuit includes on one hand, a stored characteristic graph 16 defining a supplemental desired intake air pressure raw value $(dP_R)$ which is negative, depending on the engine speed (n) and the fresh air mass flow control difference $(dm_L=m_L-m_{Ls})$ and, on the other hand, a characteristic curve memory 17 in which a characteristic curve for a multiplication factor F of between zero and one depending on the opening cross-section (q) of the exhaust gas recirculation valve 10 is stored. This factor F remains zero for values of the opening cross-sections which are below a predeterminable threshold value $q_0$ and it then increases linearly with increasing opening cross-section of the exhaust gas recirculation valve above the threshold value $q_0$ up to the value one. In a multiplier 18, the desired supplemental pressure raw value $(dP_R)$ is multiplied by the multiplication factor F for generating a desired intake pipe supplemental pressure value dP which is then added, as a negative value, to the desired intake pipe base pressure value $(P_G)$. The resulting value is submitted to a maximum selection unit 19 to which also an admissible desired minimum value $(P_M)$ is supplied. The admissible desired intake air raw pressure value $(P_M)$ is-like the dessired intake air raw pressure value $(P_K)$-determined from a stored performance graph 20 which includes this value dependent on the engine speed (n) and the engine load (L). The performance graph 20 is so selected that the respective performance graph value represents the desired intake air pressure value which must be at least maintained for a particular engine operating point in order to prevent operation of the engine under unfavorable operating conditions with an undesirably low intake air pressure. The maximum selection unit 19 insures that the desired minimum pressure P is maintained by selecting the larger one of the two pressure values supplied to it as the desired intake air pressure $P_s$ to be utilized for the intake air throttling and the charge air pressure control. The selected larger value $P_s$ is then supplied to a control unit to serve as the respective control value.

With this control part of the engine control arrangement for a Diesel engine as illustrated in FIG. 1, the exhaust gas recirculation is attended to in an advantageous manner during intake air throttling procedures and during charge air pressure control procedures. As long as the exhaust gas recirculation valve is not opened beyond a certain degree, that is, as long as the opening cross-section is smaller than the threshold value $(q_0)$, the performance graph-based desired intake air pressure base value $(P_G)$ is utilized unaltered as the desired intake air pressure $(P_s)$. Upon further opening of the exhaust gas recirculation valve, the fresh air mass flow control difference $(dm_L)$ can finally no longer be adjusted to zero which indicates that a sufficiently high exhaust gas recirculation rate can no longer be achieved by increasing the flow cross-section of the exhaust gas recirculation valve. Then, a correspondingly increasing desired supplemental pressure value (dP) is deducted from the performance graph-based desired intake air pressure base value $(P_G)$ for obtaining the desired intake air pressure $P_s$. This reduction of the desired intake air pressure $(P_s)$, which depends on the opening degree of the exhaust gas recirculation valve 10 and the fresh intake air mass flow control difference $(dm_L)$, has the effect that the fresh intake air is throttled or the charge air pressure is controlled so as to provide a lower intake air flow pressure (P) that is, that a greater intake air flow throttling and/or a lower charge air pressure is provided whereby, with a given opening cross-section of the exhaust gas recirculation valve, the exhaust gas recirculation rate can be increased.

The Diesel engine control arrangement as described herein accordingly provides for an automatic adjustment of the intake air throttling and the charge air pressure control to the operating state of the exhaust gas recirculation control. This greatly simplifies the application of the control arrangement in different Diesel engine arrangements. All three control functions can be optimally adjusted. There is no negative influence between intake air throttling and charge air pressure control. The intake air pressure is accurately controlled during intake air throttling operations as well as during charge air pressure control operations. It is not only set to a certain value. It is rather constantly checked. The exhaust gas recirculation rate which is responsible to a large degree for the exhaust gas emission behavior of the engine is based on a single performance graph which determines the desired value for the fresh inlet air mass flow depending on given engine operating conditions.

What is claimed is:

1. An apparatus for controlling a Diesel engine with exhaust gas recirculation and intake air flow throttling, comprising:

a control circuit for controlling the rate of exhaust gas circulation by means of an exhaust gas recirculation control member using an engine intake air mass flow as a control value, and a control circuit for controlling the intake air flow pressure by means of intake air throttling including a means for determining the desired intake air pressure for the throttling of the intake air and for determining charge air pressure such that the desired intake air pressure comprises the sum of a desired engine operating point-dependent base pressure value and a desired supplemental pressure value which is obtained by a multiplication of a desired engine speed dependent supplemental pressure raw value which is dependent on the engine speed and the fresh intake air mass flow control difference of the exhaust gas recirculation control, by a factor which depends on the opening degree of the exhaust gas recirculation control member.

2. An apparatus according to claim 1, wherein the multiplication factor which is dependent on the opening cross-section of the exhaust gas recirculation control member is set to zero within a range of the opening cross-section of the exhaust gas recirculation valve between zero and a predetermined threshold value and then continuously increases from zero to one within the opening range between the threshold value and the maximum opening cross-section.

3. An apparatus according to claim 1, wherein said control circuit includes an intake air minimum pressure characteristic graph providing an engine operating point dependent desired minimum intake air pressure and a maximum selection unit to which this desired minimum intake air pressure and a pressure value formed by the sum of the desired intake air base pressure and a desired supplemental pressure value are supplied and which selects the larger of the two pressure values as the desired intake air pressure value for the control of the intake air throttling and, when appropriate, the charge air pressure control.

* * * * *